United States Patent [19]

Smith et al.

[11] Patent Number: 5,181,162

[45] Date of Patent: Jan. 19, 1993

[54] DOCUMENT MANAGEMENT AND PRODUCTION SYSTEM

[75] Inventors: Robert M. Smith, Andover; David M. T. Ting, Sudbury; Jan H. Boer, Lexington; Marvin Mendelssohn, Melrose, all of Mass.

[73] Assignee: Eastman Kodak Company, Rochester, N.Y.

[21] Appl. No.: 446,937

[22] Filed: Dec. 6, 1989

[51] Int. Cl.$^5$ .................. G06F 1/00; G06F 15/20
[52] U.S. Cl. ................... 364/419; 395/600; 395/650
[58] Field of Search ............ 364/419, 200, 900; 395/600, 650

[56] References Cited

U.S. PATENT DOCUMENTS

| | | | |
|---|---|---|---|
| 4,539,653 | 9/1985 | Bartlett et al. | 364/900 |
| 4,713,754 | 12/1987 | Agarwal et al. | 364/200 |
| 4,723,209 | 2/1988 | Hernandez et al. | 364/300 |
| 4,723,210 | 2/1988 | Barker et al. | 364/300 |
| 4,723,211 | 2/1988 | Barker et al. | 364/300 |
| 4,739,477 | 4/1988 | Barker et al. | 364/300 |
| 4,811,199 | 3/1989 | Kuechler | 364/200 |
| 4,899,136 | 2/1990 | Beard et al. | 340/706 |
| 4,953,080 | 8/1990 | Pysart et al. | 364/200 |
| 4,959,769 | 9/1990 | Cooper | 364/200 |
| 4,969,093 | 11/1990 | Barker et al. | 364/900 |
| 4,989,132 | 1/1991 | Mellender et al. | 364/200 |

Primary Examiner—Gail O. Hayes
Assistant Examiner—A. Bodendorf
Attorney, Agent, or Firm—Mark Z. Dudley

[57] ABSTRACT

An object-oriented document management and production system in which documents are represented as collections of logical components, or "objects", that may be combined and physically mapped onto a page-by-page layout. Stored objects are organized, accessed and manipulated through a database management system. At a minimum, objects contain basic information-bearing constituents such as text, image, voice or graphics. Objects may also contain further data specifying appearance characteristics, relationships to other objects, and access restrictions.

20 Claims, 3 Drawing Sheets

DOCUMENT MANAGEMENT AND PRODUCTION SYSTEM

FIELD OF THE INVENTION

The invention relates to the field of computer-based document management, and in particular to an integrated system for creating, distributing, producing and managing various types of multi-component documents.

DESCRIPTION OF THE RELATED ART

Document composition, assembly and production is today often accomplished in an automated environment. A typical word processing system, for example, permits entry and modification of text to occur on a host-connected terminal prior to generation of hard-copy output. A user may perform a variety of merge, copy and transfer operations within a document or among several documents in a straightforward and efficient manner.

Likewise, automated publishing systems have replaced fully manual and typesetting procedures, permitting interactive page composition and formatting. Typically, embedded layout or formatting commands are entered by the user along with text, graphic or image information, and then implemented by the system. Word processing and automated publishing systems may reside in a single terminal, be distributed on a time-share basis or contained in a number of network-linked microcomputers.

The majority of present-day document processing systems are directed solely to the task of creating and editing documents. However, many users require integration of various program applications in order to merge their outputs. In response to this need, a number of multiple-function programs have recently emerged. These programs combine several applications, such as word processing, data processing and spreadsheet operations, into a single integrated system.

Function integration and multi-user capabilities, however, do not necessarily automate the process of producing complex documents, where the difficult aspects of document creation lie in coordinating the efforts of a large number of creative participants, generating text that is not readily produced by conventional data processing application software or shepherding an evolving document through a series of sequential procedures. A system designed for such sophisticated applications must support an elaborate file structure capable of discriminating among users and tracking the progress of procedural operations, allow access to discrete document portions in order to maximize the number of users who may simultaneously work on a document, and facilitate modular construction of complex documents with considerable flexibility. The system must also be compatible with an array of external application software packages that is sufficient to support document assembly and output.

The present invention exploits a class of computer programming that utilizes an "object-oriented" approach to document production. In an object-oriented system, data is stored in self-contained programmatic structures that also contain procedures for manipulating the data. The procedures need not reside in the same area of memory as the data, nor need the routines specifying the procedures be replicated in each object. Rather, the object may comprise only a set of pointers to data and procedural files that can be shared by many objects. The invention uses objects to represent documents as collections of logical components (such as chapters of a book or sections of a newspaper) which may be combined and physically mapped onto a page-by-page layout when sufficient content has been introduced to make this operation meaningful.

The use of object-oriented environments in the field of document manipulation is not new. U.S. Pat. No. 4,739,477 and U.S. Pat. No. 4,723,209 describe an object-oriented document system that allows multiple data sets to be assigned to a single displayable area of a document. Furthermore, word processing systems sometimes represent documents as a series of logical segments that contain information in order to facilitate formatting into pages. See, e.g., U.S. Pat. No. 4,539,653, which describes a formatting scheme in which pages are divided into named regions referred to as "logical pages"; a user may assign text or graphics to these regions by means of embedded commands contained in the text data stream. The latter reference does not disclose an object-oriented system for mediating between logical and layout document components, and neither reference is directed toward an integrated system of document production wherein documents are organized into DBMS-managed objects and gradually assembled in response both to user commands and programmed procedures.

DESCRIPTION OF THE INVENTION

Objects of the Invention

Accordingly, it is an object of the present invention to provide a novel system for creating, distributing, producing and managing various types of complex documents.

It is another object of the invention to support coordinated, multiple user access to various components of complex documents.

It is a further object of the invention to maintain individual document components as discrete units that may be accessed selectively and combined by the user or by means of external programming.

It is another object of the invention to provide a general platform which may be customized to suit a variety of publishing, case management and document handling applications.

It is yet another object of the invention to provide an object-oriented, data-base-centered computational environment for the storage, modification, organization and retrieval of documents.

Summary of the Invention

The invention decomposes a document into logical components, which are stored as discrete "objects" in an object-oriented computational environment. Stored objects are organized, accessed and manipulated through a database management system (DBMS). The DBMS provides a coherent, consistent encoding of object content, object attributes and inter-object relationships. Ultimately, the objects are assembled into an integrated whole when the document is to be physically produced, i.e., printed or displayed electronically or electronically transmitted. At a minimum, objects contain "content," that is, basic information-bearing constituents such as text, image, voice or graphics. Objects may also contain further data ("attributes") specifying (a) logical or physical relationships to other objects or to the document as a whole, (b) characteristics relating to the appearance of the content, or (c) access restrictions. For example, a check may be divided into the simple logical objects "check number," "payee," "payor," "amount,", "signature," and "account number." The content of the logical object "check number" will be the representative characters, but this object might also contain a layout attribute indicating that it is to be placed at the upper-left-hand corner of the check document. A character font may also be specified. In addition to attribute data, an object can contain procedures that store, send, delete, modify and display the object.

Objects in a document may be hierarchically related to one another, such that one object may draw some or all of its content and/or attributes from another object or objects. This permits objects to be reused, resulting in efficient memory utilization. For example, an advertisement may be stored as an object, but incorporate a stock photograph stored as a second object. That photograph may be accessed by other objects within the document, and in other documents.

Objects may also be organized according to class, permitting multiple objects to inherit the same set of characteristics and attributes. For example, a document object may be subclassified as a check document, and all check documents may contain the same set of content objects.

Documents can themselves be represented as objects, when this level of generality is appropriate, and collected into bundles referred to generically as "folders." Folders, too, can be represented as objects. (Hereinafter, the terms "folder object" and "document object" will refer to the folder or document itself, rather than the objects contained therein.)

Objects are broadly classified as "logical" and "layout" objects. A logical object defines the relationship between different portions of content, as well as between documents. Layout objects specify the physical distribution of content within the logical object, and define physical locations on a page or within a document. Layout objects may include page sets (e.g. sections of a newspaper or periodical); pages; frames, which represent regions within a page; and blocks, which represent subregions.

Separating physical layout from logical relationship permits coordination of work activity among a large number of users, because user access can be limited to appropriate document elements and requests for document components prioritized to prevent simultaneous access. In addition, the invention can control access based on a work-flow model of document assembly, wherein a user's ability to make modifications or additions is contingent on the occurrence of a previous event.

Prior art systems are limited in terms of multiple-user support, despite the growing importance of distributed operations in the publishing industry. This advantage of the invention is particularly suited to publications that are generated by teams of specialized personnel, some responsible for various aspects of physical appearance and others primarily concerned with content. Delaying complete merger of both content and layout until actual production permits non-conflicting priority requests to be implemented automatically, while reserving editorial resources for the more difficult allocation decisions.

A document object contains pointers to content objects (which themselves contain the basic information-bearing constituents), as well as to logical objects and layout objects. Examples of logical objects are "First News Story" or "First News Story Photo". Examples of layout objects are "Page One" or a dimensional specification of a portion of Page One. Logical objects can contain attributes specifying locational preferences within the document, but these are not evaluated until logical objects are mapped into layout objects during pagination. Document objects may also contain attributes relating to the appearance of various fields within the document (e.g. different font types for different portions of a page); alternatively, these can be maintained within the content objects.

Objects are created, organized and accessed by means of an object-oriented DBMS. The current embodiment of the invention can utilize any of a number of general-purpose DBMSs, appropriately supplemented to facilitate object-oriented operation. The selected DBMS is structured according to the particular system application so that a basic set of "native" or standard objects will be available to the users. The DBMS should also accommodate new objects defined by users and integrate them within the existing framework. Objects are organized within the DBMS by type (e.g. Page Set) and by name identifier (e.g. Business Section). The information contained in a content object may be stored within the DBMS or external to the DBMS; in the latter case the DBMS contains a pointer to the memory address of the content.

The user obtains information about objects and accesses objects through a variety of utility programs integrated within or callable by the system. These access the DBMS directly and provide editing, display and output functions which are appropriate to the particular system application. Indeed, the DBMS is most appropriately viewed as a kernel, to which access is accorded to various application packages.

For example, users of a document management system may need only simple text editing capabilities that permit input and modification of text, composition functions to format text, and fonts to specify output of text on typesetters and other output devices; by contrast, publishing systems can require sophisticated image processing and graphics capabilities, as well as integration of output arising from multiple sources. Objects of the present invention are configured so as to require values for a consistent set of parameters, thereby facilitating interface with a variety of application programs, input devices and output devices. So long as the application program is equipped to provide values for these parameters, interaction with discrete objects can occur.

Direct communication between the user and the DBMS, when appropriate, may take place in Structured Query Language (SQL). This standard language interfaces most easily with DBMS systems. More commonly, content is retrieved from the DBMS by an application program (e.g. an editor) through the system's input/output system, and the user interacts with the application program only. Application programs typically feature menu-driven or command-driven interfaces which are more convenient to use than SQL. After the user's session with the application program has been completed, the modified content is passed back to the DBMS for storage. The DBMS maintains immediate supervisory control over retrieval and storage of files.

Access to objects can be selectively restricted by insertion of appropriate "access" attributes within such objects. The user's attempts to gain access to an object will depend on fulfillment of the criteria specified in the attribute. For example, an access attribute can require a proper user identification or terminal location. The DBMS can be configured to scan this attribute of an object prior to retrieval, and refrain from returning the object unless a match is detected.

In addition to characteristics of the user, access can depend on a sequence of procedures that must be performed on the desired object or related objects. As an example, the content of a newspaper story might not be available for layout until the author's supervising editor has approved the text. Thus, access to or manipulation of the corresponding object must be restricted pending completion of this prerequisite operation. This state-transition model of object manipulation can be extended to encompass not only preconditions for object access, but post-conditions as well. For example, modification of an object may be restricted until the DBMS has been given an acknowledgement of the object's receipt by an application. Status attributes can also be included within objects to record the performance of procedures on the objects, and the access attribute of the desired object can be set to evaluate the status attributes of its own object or a related object. So long as the application program or DBMS retrieval routines have been configured to respond appropriately to status and access attributes, the user retains complete flexibility to design work-flow procedures and/or personnel restrictions.

As noted previously, the invention separates the content and classification of a document component from its physical location. Accordingly, the process of building a document depends largely on its organizational priorities. "Content-driven" documents are composed of logical components that exhibit a consistent physical layout pattern. An office letter can be extremely content-driven, in that its logical components always fall within precisely describable physical locations on the printed document. A less extreme example might be a literary novel with sequential chapters; although the exact lengths of chapters may vary, their sequential physical organization remains consistent. Other documents are "layout-driven," meaning that physical appearance is accorded first priority over content. An example might be a catalogue, wherein the arrangement and relative sizing of items on a page can be different for each page of the catalogue, while the content may well be standardized or provided to the user by an outside source. The invention is capable of accommodating both types of document creation strategies, as discussed below.

The invention may also be utilized in environments where various procedures are performed on documents over time by different work units; such applications are referred to as "work-flow processing." In a typical work-flow environment, work groups or departments discharge tasks that require examination or modification of documents kept in files and/or archives or which are created during the work; examples of organizations that make use of work-flow processing are insurance claims processing departments or advertising organizations. The documents, with work requests, are routed to appropriate personnel within a department, processed, and then returned to storage or to another work group for further processing. The path followed by a particular folder or set of folders may be determined by the individuals working on them or may follow a pre-planned course.

In such contexts, it may become necessary to superimpose a computer program—referred to as an "application agent"—onto the DBMS. The application agent follows a set of rules to route objects to appropriate personnel at the proper time or pursuant to external command, and to perform autonomously on objects those procedures amenable to automated discharge. The application agent can also provide status reports relating to various objects within the DBMS. However, if the work-flow path is simple enough, an appropriately chosen set of status and access attributes attached to the relevant objects may be sufficient.

The DBMS is also configured to provide the proper utility programs to personnel in various work groups, and provide access to another work group's system where appropriate.

BRIEF DESCRIPTION OF THE DRAWINGS

The foregoing and other and further objects of the invention will be understood more readily from the following detailed description of the invention and the present embodiment, when taken in conjunction with the accompanying drawings, in which.

DETAILED DESCRIPTION OF THE INVENTION

1) System Components

Ideally, the invention utilizes an object-oriented database. However, the existing embodiment of the invention employs INGRES, a relational database marketed by Relational Technology, Inc., augmented by a series of additional software modules that support object-oriented operation. With these additional modules, any DBMS capable of distributed implementation and, preferably, providing an SQL interface can be used advantageously.

As hereinabove noted, the invention accommodates simultaneously both the content-driven and layout-driven strategies of document creation. This is accomplished by maintaining a computational distinction between logical objects and layout objects.

Figure 1:
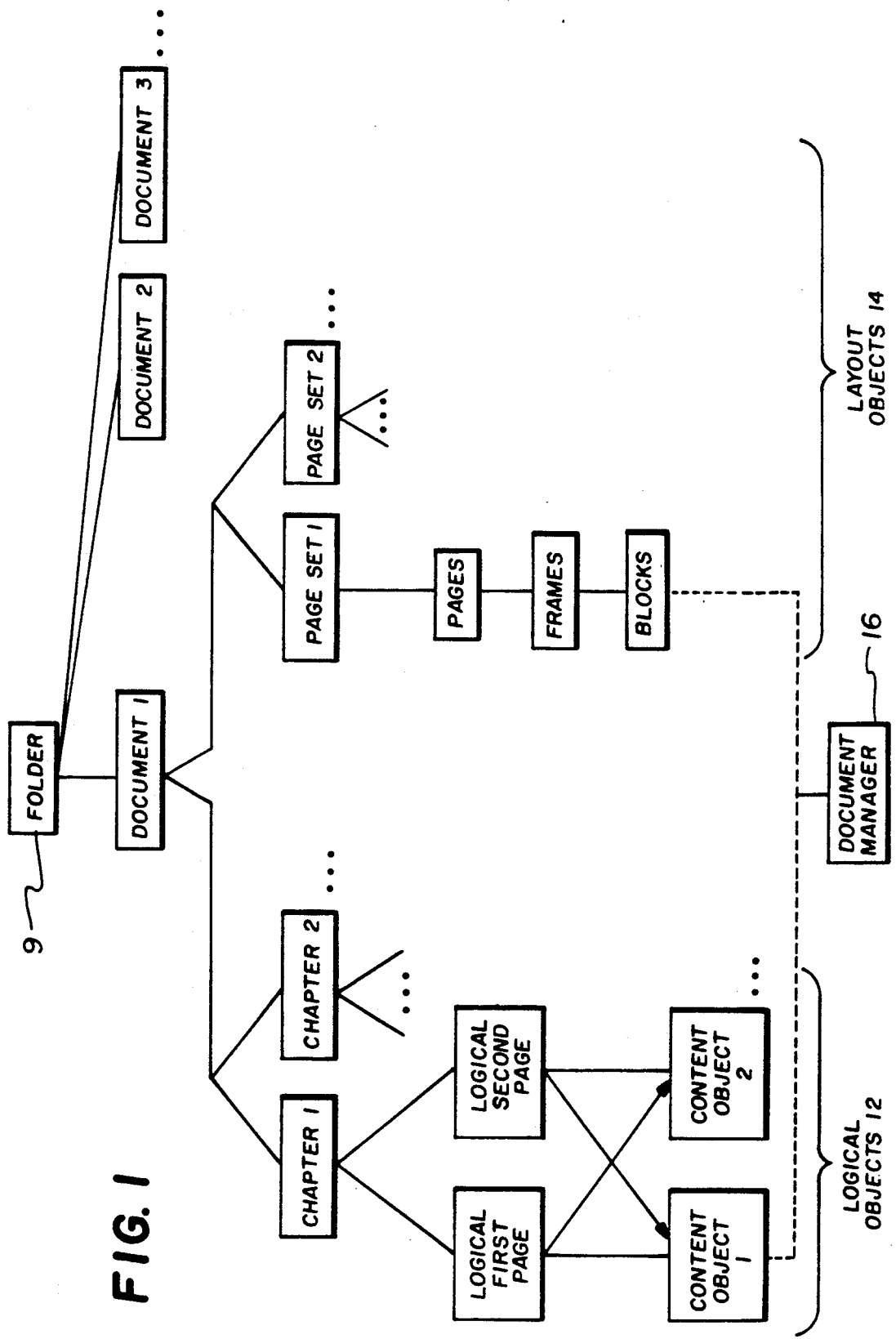
FIG. 1 depicts the basic hierarchical organization of objects according to the present invention, in the context of a book consisting of sequential chapters.

FIG. 1 schematically depicts logical and layout objects in the organization hereinabove described. The particular example depicted in FIG. 1 is a book containing sequential chapters. Logical objects, which appear on the left side of the drawing, represent the conceptual organization of the book. Layout objects, which appear on the right, represent physical divisions of the document. Logical objects remain separate from layout objects until mapped thereon by document manager 16. Document manager 16 is typically a supervisory computer program which creates a tentative initial version based on layout parameters, content object attributes and the content itself, although the necessary operations may be performed manually if necessary. All objects may contain attributes and "bindings," which are attributes that specify computational procedures; these procedures are called and executed, either by a properly configured application program or by the input/output system, upon the occurrence of conditions specified as part of the attribute. Content objects are hierarchically subordinate to logical objects, but their attributes may influence layout objects by specifying placement parameters.

Figure 2:
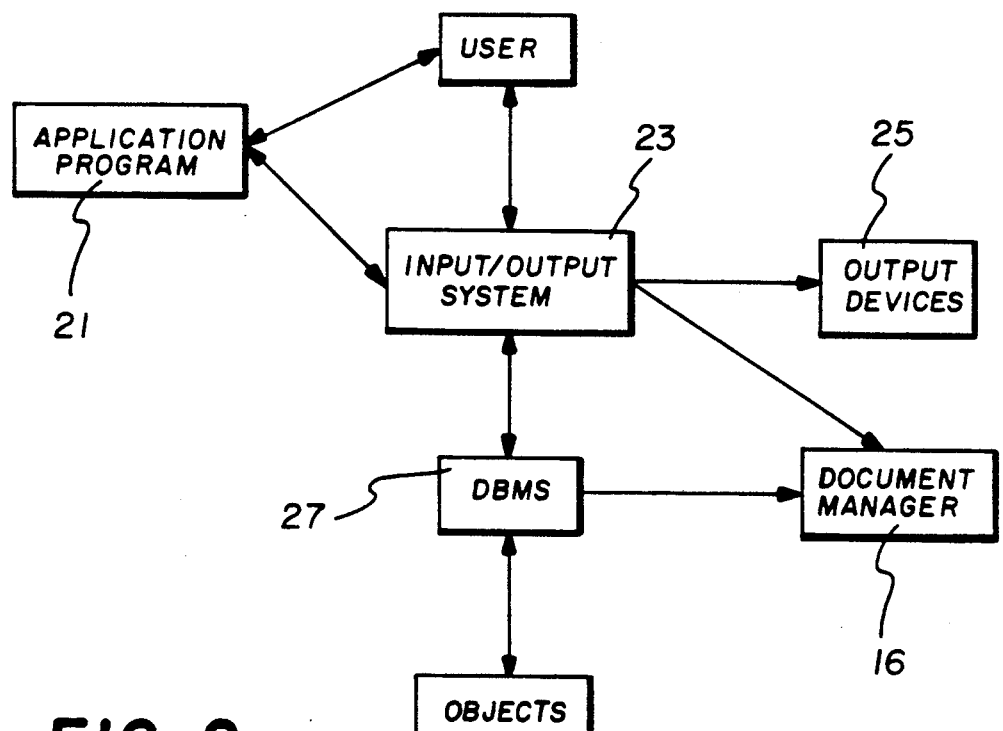
FIG. 2 illustrates the computational modules comprising the present invention.

FIG. 2 illustrates the basic organization of the invention. In a simple system comprising no automated-assistance programming, a user seeking to construct a content-driven document would enter content and attributes through an application program 21 into native or user-defined content objects, which collectively describe the logical document. Alternatively, the user may add or modify content directly through DBMS 27 using SQL commands. DBMS 27 maintains the organization of all objects and controls access thereto, but all communication with DBMS 27 is performed through input/output system 23 (described below).

Next, the user would similarly enter basic layout parameters (such as margins and justifications) into the layout objects. When the user has entered all available content and layout parameters, the objects are submitted to document manager 16, which generates final layout parameters based on those already provided by the user, the set of logical objects and the amount of content. As a simple example, the author of an interoffice memorandum bearing a standard format might specify a style of header, its page position, the contents of header subobjects (such as the addressee and date), and the content of the memorandum itself. Document manager 16 produces an appropriately formatted version of the memorandum based on these values. The paginated memorandum is then sent to input/output system 23. In this example, input/output system 23 converts the document into a text stream for output onto a suitable viewing device. The user has the ability to alter format and/or content as desired, and send the document to other output devices.

Alternatively, the author of a layout-driven document could enter precise values for the layout objects, thereby defining a physical structure into which content may be loaded. This structure is ordinarily displayed to the viewer prior to entry of content. For example, the designer of a single- or multi-page advertisement might specify a set of borders, angular rotation of specific portions of text, the location of an image within a page and a color model (which establishes the method of encoding the color of each data element). When the format has been satisfactorily determined, the user could enter text directly into the allowed layout spaces, lengthening, shortening or altering the fonts as necessary to accommodate the layout.

Complex documents such as newspapers are both content-driven and layout driven to various degrees, depending on editorial proclivity and the particular locations within the newspaper. In such circumstances, additional software support mediates the elaborate relationship among content size, content attributes and layout objects.

2) Object Management

Content objects contain raw data that may be decoded by appropriate output devices. Such data may take the form of floating-point values, fixed-point numbers, alphanumeric characters, byte strings, binary values, or similar primitive elements. For example, the data of an image typically consists of a series of pixel encodings. A standardized series of attributes is also associated with each object these attributes are interpreted by the various components of the invention as necessary. Attributes such as color model, resolution, position and decoding procedures, stored as part of an image object, provide necessary output information to input/output system 23. Text object attributes relating to output include style commands, fonts and typesetter driver functions. All objects carry a name and classification, which is utilized by DBMS 27 to facilitate access and linkage between attributes and objects.

Document objects and folder objects consist primarily of pointers and attributes. Document object pointers specify the logical and layout objects associated with a particular document; when the document has been fully composed, all content objects are bound to layout objects. Multiple layout objects (such as portions of corresponding pages in different versions of a newspaper) can share the same content objects. The hierarchically superior folder object pointers specify documents.

As shown in FIG. 2, objects are output to external devices by input/output system 23, a computational module which obtains objects from DBMS 27 and arranges the content in display order. An input/output system suitable for use with the present invention is described in copending application Ser. No. 07/446,975, filed contemporaneously herewith and incorporated herein by reference. Input/output system 23 merges and translates these objects into a linear list of output commands to drive one or more of output devices 25.

As noted above, the user is provided with one or more utility programs 21 to assist with composition, which consists of content entry, modification, pagination and style choices. The primary utility program for most applications relates to text processing and layout modification, and is referred to as the "text subsystem." The text subsystem consists of a sophisticated word processing system that allows entry of text characters, style and format commands which determine the physical layout and appearance of characters, and graphic shapes; such systems are well-known in the art. The word processor should be equipped with word-wrap and hyphenation features.

After text input, modification and storage, the text subsystem supports an interactive, interleaved process model that facilitates imaging and positioning of text characters as they will appear in the visual output of the system. Input/output system 23 facilitates visual imaging or "mock-up" (i.e. dummy renditions) of these objects, the appearance of which may be specified by an attribute. In complex typesetting applications, the text subsystem calculates the physical size of the text block, and permits characters to be positioned within graphical shapes and set onto baselines within columns or within blocks. When the typeset version is finalized, the text subsystem formats the content into a multi-byte description of each text character. Information concerning the relationship of text characters to one another are stored as attributes bound to text objects. These attributes and embedded encodings are interpreted by input/output system 23, where they are translated into commands that will drive the particular output device chosen.

A second utility program, useful in publishing applications, is the "image subsystem." This utility program facilitates input of image data for designation by the DBMS as an object and user manipulation of the entered image. The image subsystem formats the completed image into pixel values and associated attributes that are interpreted by input/output system 23.

Image input may be accomplished in a number of ways, e.g. through a conventional optical scanner, which digitally encodes tonal values of a flat image passed beneath an electronic detector, or through communication channels of equipment capable of encoding a subject in pixel format. The application program that interacts with the input device is responsible for furnishing values for the invention's set of image attributes.

The image subsystem operates on images resident in system memory. Editing functions permit the user to access and modify the position, color and density of image pixel values. A suitable image processing system should also be capable of point manipulation, as well as manipulation (e.g. rotation, cropping and scaling, and color modification) of an image component or the entire image. Again, such systems are known and readily available to those skilled in the art.

Output of an image by input/output system 23 requires retrieval of the actual data representing the final image or image rendition, translation of this data and associated image attributes into display data, and transmission to the selected output device.

DESCRIPTION OF AN ILLUSTRATIVE EMBODIMENT

A particularly useful application of the present invention is in an integrated newspaper publishing environment. This complex application draws heavily on the system's power to accommodate large numbers of users simultaneously adding or modifying content or layout constraints; multiple document versions that contain much of the same content; and intricate, recursive relationships among layout, content and independent user choice.

A daily newspaper contains two basic categories of content: stores and advertisements. Each category may consist of one or more data types (i.e. text, image or graphics). Large newspapers are typically printed in more than one version owing to geographical and timing constraints. Many advertisers wish to target particular geographical zones rather than the entire circulation of the newspaper, necessitating a variety of geographically based versions. Such versions may also vary in news content. In addition, the length of time required for distribution to various areas necessitates several press runs in order for the newspaper to reach near and far-away areas simultaneously. Each successive press run, or "edition," will contain some fresher news than the previous run; however, advertising will not ordinarily change over editions that are distributed within the same geographical zone. Consequently, the different versions of a daily newspaper will share many common features of content, but include different content and layout characteristics as well.

The content of stories derives from the contributions of numerous participants at varying levels of responsibility. Access privileges for these participants may be restricted to a single story maintained as a logical object, or can include numerous stories and/or layout objects. In addition, work flow or "copy flow" requirements can dictate that specific procedural sequences take place on certain objects during content entry or composition.

The different versions of a newspaper may be considered members of a folder, with each version representing a separate document. Each version is organized into logical and layout objects, which share content objects with other versions. Organization of the content into layout objects may be performed manually or by use of a suitable Document Manager software package.

a) Database Organization

The present embodiment of the invention uses an ordinary relational DBMS supplemented by a set of special commands and functions—referred to as Data Access Library (DAL) routines—to maintain encapsulation of objects. In essence, DAL routines add object-oriented features to a relational DBMS. Without the DAL routines, object components would remain as loosely linked data structures, forcing application programs to contend with complex storage and retrieval pathways. By contrast, the object-oriented DBMS permits simple retrieval by means of direct query-type requests. DAL routines therefore provide the utility functions necessary to mediate between application programs and a generic relational DBMS.

The relational portion of the DBMS organization consists of two tables, the Object and Attribute ("O/A") Table and the Relationship and Property ("R/P") Table. The organization of each of these tables can take numerous forms. Essentially, the O/A table relates objects to associated attributes. One valid representational schema defines rows and/or columns as object attributes, with each entry in the table consisting of the identifier of an object and pointers to the data structure of the object. The data structure contains attributes affixed to the object. Alternatively, the rows (or columns) can specify objects with the columns (or rows) specifying attributes; entries then consist of on/off conditions.

Another function of the O/A table is to maintain the inheritance characteristics of objects. Each entry in the table can further include an object identifier field, in which ar stored identifiers of the objects to which the specified attribute is linked; alternatively, this information can be retrieved from the R/P table directly. Either structure permits inheritance of attributes among hierarchically related objects. Accordingly, storing the identifier of the "parent" object is sufficient to link the list to subordinate "offspring" objects. For example, attributes relating to a physical page will apply to physical sections of that page as well, unless otherwise specified in a different list linked to such physical sections.

The R/P table establishes hierarchical and other specified relationships (such as page location and placement) among objects, as well as classification ("property") data such as whether a content object is a story or an advertisement. Property data can also specify characteristics associated with a particular relationship, such as a scaling factor that varies depending on where the object is to be placed. One valid representational schema defines rows as relationships and columns as properties, with each table entry consisting of the identifier of the object. Because the entire set of relationships would be extensive (and result in numerous empty spaces in the table, since a particular relationship may exist for only one object), the size of the table may be reduced by assigning a separate table to each object. The resulting R/P tables then consist of rows specifying object properties, columns specifying relationships, and entries consisting of ofon/off conditions.

Either structure permits attributes and object properties to be invoked only when appropriate in terms of a particular relationship. For example, a content object's scaling factor may differ depending on where the object is placed, i.e. with which layout object it is associated. In this case, one property of the linkages between the content object and various layout objects would be scale, the value of which might vary with each linkage.

i. DAL Routines: Tracker

A group of DALs collectively referred to as "Tracker" performs memory allocation and deallocation functions related to object retrieval.

- dal_trk_alloc: allocate a memory block sufficient to contain object and all subobjects specified therein. This DAL accepts input of the desired object and the lowest-level subobject to be retrieved. If no lower-level object is specified, all subobjects are assumed. Allocation is performed by sequentially retrieving object filenames from the data structures of the desired object and linked subobjects, determining the length of each (by reference to DBMS record data), and creating a memory block sufficient to contain all of the designated object files.
- dal_trk_dealloc: Deallocate the memory block created by dal_trk_alloc.
- dal_trk_outp: Retrieve the specified object and subobject files. Like dal_trk_alloc, this DAL accepts input of the desired object and the lowest-level subobject to be retrieved. If no lower-level object is specified, all subobjects are assumed.
- dal_trk_obj: Find and return all links between parent and child objects of a specified object. This DAL parses the R/P table to obtain the names of hierarchically superior and inferior objects, as well as properties associated with the relationship.
- dal_trk_attr: Find and return all attributes linked to a specified object. This DAL parses the O/A table to retrieve the list of attributes associated with a particular object. As an example of its use, an editing application program would use an object's presentation attributes to create an appropriately formatted display list of the object content once it has been paginated.
- dal_trk_objnames: Find and return a list of all logical or layout object names at a specified level. For example, if the root level is chosen, this DAL will retrieve a list of all versions of the document (specifying publication, date, zones and editions). If the page level is chosen, a list of all pages (logical o physical) is retrieved. Should the R/P table be configured on an object-by-object basis, this DAL parses the set of tables for objects specifying the correct number of inferior or superior objects.
- dal_trk_fndpg: Find and return the object name of a single logical or physical page of a newspaper based on specified values for version and page number in that version by retrieving the object name associated with the page in the O/A table.
- dal_trk_who: Retrieve a list of users permitted to access a given physical or logical page. This DAL evaluates the locking attribute of an object with respect to specified conditions, permitting access to be accorded on the basis of identity or completion of appropriate procedural sequences.

ii. DAL Routines: Page Assembly

The following DAL routines assemble objects corresponding to a physical page after the elements have been composed, placed and made ready, thereby encapsulating page-related objects and associated output routines into an output-ready physical page. After application of these DALs, physical pages can be moved or output as unified constructs, because all necessary components have been linked to that page.

The layout DAL creates or collects story elements (such as text blocks, pictures or graphic images) and specifies their locations within an existing or newly created layout object on a physical page. Layout element creation precedes entry of content in a "layout-driven" mode of document assembly; in a "content-driven" mode, layout objects are created around the entered content.

- dal_assign_elt: Create a story element or associate an existing story element with a layout object at a specified position. If the story element is to be created, a new logical object identifier and data structure are entered into the O/A table, and the DAL accepts entry of content. If the story has already been created, the identifier of the object is used.

If no layout object is identified, the next hierarchically superior object is the physical page, and positional information is presumed to relate thereto. The entered content will extend the Width of a standard column. Using default settings, a layout object of sufficient size is then created by appropriate entries in the O/A table, and linked to the entered content by an appropriate entry in the R/P table.

This DAL requires provision of the following data:
a. Publication
b. Edition
c. Zone
d. Section
e. Page number
f. Story name
g. Story element name
h. Name of parent object
i. X and Y coordinates of placement with respect to upper left corner of parent object
j. Content (if no object specified)

Folio DALs obtain the information necessary to output the folio components of a page based on characteristics specified by the user. In the present embodiment, these DALs and their associated functions are as follows:

- dal_get_folio_names: Allocate memory space for data structure, access folio table and retrieve set names for user-specified folios.
- dal_get_folio_set: Retrieve from database all folios suitable for user-specified position (right side, left side, or both sides of page), and allocate an array of data structures to contain data relating to each qualified folio; enter user-specified information into data structures; return address of array and count of data structures within array. Each data structure contains the following elements:
  a. Name of folio set
  b. Folio name for one folio of the set
  c. Horizontal size
  d. Vertical size
  e. Horizontal location (left side, right side, both sides of page)
  f. Vertical location (in page coordinates)
  g. Pages where folio is to appear
- dal_get_folio_row: Extract data relating to a particular user-specified folio by parsing the O/A table, enter the data into one of the data structures set up by dal_get_folio_set, and return the memory address of that data structure.

The object retrieval DAL specifies the content portions of a page and placement thereon. Objects can include logical objects or portions thereof (which are themselves objects created during the pagination process, when objects too big for placement on a single page are divided into smaller units), such as the part of a story allocated to a particular physical page, or another physical page object.

> dal_get_object: Retrieve or create the object specified by name, clipped to the boundary set during pagination. Because objects are stored as files containing both data and length information, this DAL returns different forms of data depending on the object type (logical or physical) and the length of its associated content data. The allowed permutations are:

Physical page: object and all subobjects returned.

Object hierarchically superior to a physical page (e.g. a section): only object itself returned.

Object hierarchically subordinate to a physical page: object and subobjects other than those linked to one or more additional physical pages returned; the unreturned subobjects remain to be paginated and thereby allocated to individual pages.

Each data structure created by dal_get_object contains the following generic set of elements, to the extent known, to facilitate output:
a. Object name
b. List of siblings (i.e. other objects linked to the same hierarchically superior (parent) object, e.g. page set and root with respect to a page);
c. List of parent (page set and root) objects; different roots may specify different page sets. For example, two different newspaper versions may share many of the same pages, but specify unique pages as well.
d. List of offspring (subobjects)
e. Type code
f. X and Y coordinates with respect to parent
g. X and Y coordinates with respect to physical page
h. Width of object on physical page
i. Height of object on physical page
j. Horizontal scaling
k. Vertical scaling
l. Rotation
m. Status (for locking; indicates whether object available for retrieval)
n. Color mask
o. Content encoding format (for output)
p. Full operating system path to content file (included for flexibility, to support some applications)
q. ID of virtual display(s) containing the page
r. ID of virtual display(s) containing subobjects
s. ID of window(s) on virtual display(s) containing the page
t. ID of window(s) on virtual display(s) containing subobjects
u. ID of viewport(s) on virtual display(s) containing the page
v. ID of viewport(s) on virtual display(s) containing subobjects The foregoing set of elements has been chosen to support the wide variety of editorial application programs typically associated with newspaper publication. Obviously, fewer or more specialized elements could be substituted according to usage requirements. Furthermore, the data structures associated with different types of objects in the present embodiment have additional elements associated therewith, in the form of attributes. The DAL dal_get_obj permits the user to enter values for these attributes when the object type is specified.

iii. DAL Routines: Output Monitoring

Output monitoring DALs create and update data structures that specify the current status of an "output job," the set of display or output instructions that describe the document to the extent defined. Job data represents a snapshot of progress made to output a document, as well as a limited historical record of content retrieval and modification. These DALs are as follows:

> dal_create_outjob: Enter a unique, algorithmically determined ID and time values into the job data structure.
>
> dal_update_outjob: Update contents of an existing output job data structure specified by the caller, to include information provided by the caller.
>
> dal_showme_outjob: Display contents of data structure relating to specified job.

b) Objects

Figure 3:
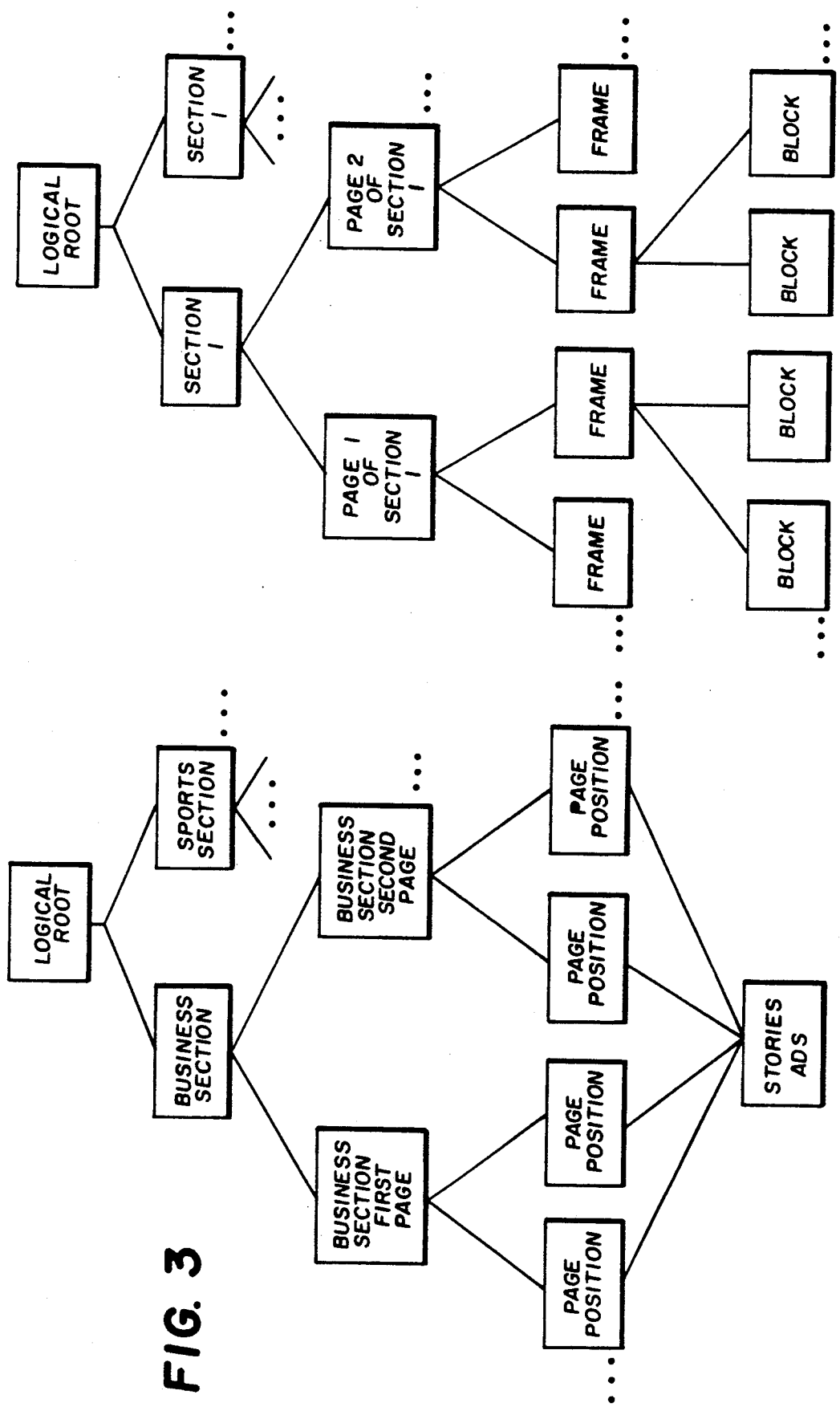
FIG. 3 details the nomenclature and basic hierarchical organization of objects in the present embodiment of the invention.

Referring now to FIG. 3, the system provides for definition of the following logical objects, based on typical newspaper organization:
1. The logical root (which specifies the publication, date, zones and editions).
2. Logical sections (the Business Section being depicted in FIG. 3).
3. Logical pages (e.g. first page of Business).
4. Page position (e.g. top-right, center). Page position can also be specified as an attribute of an object.
5. Stories
6. Advertisements
7. Content objects, which include:
    a. Story elements (e.g. text, pictures)
    b. Advertisement elements
    c. Generic folio (defines a content block with associated page position);
    d. Generic jump box (maintains coordination between multiple pieces of a single story or story element without the need for absolute page numbers)

The content objects, hierarchical subsets of the logical objects, point to memory locations containing display data. A content object may contain text, image or graphic content. Several logical objects (e.g. stories in different versions) can point to the same content object.

Layout objects include:
1. The layout root (which holds the newspaper name and points to the page sets and/or pages).
2. Page sets, which correspond to newspaper sections.
3. Pages.
4. Frames, which are rectangular areas entirely contained within a page.
4. Blocks, which are rectangular areas contained within a frame.
5. Ad Stack: Dynamic object which specifies all locations of the physical paper which have been assigned to advertisements. This object is built by parsing the R/P table for advertisement-type objects (the same function could be performed by searching the type attributes of all content objects associated with layout objects to identify advertisement-type objects), and so will expand and contract in size as advertisement objects are created and deleted. Because this object specifies all component content objects, the user ma lock the entire set of advertisement objects with a single lock command to the Ad Stack object.
6. News Hole: Dynamic object which specifies all locations of the physical paper which have been assigned to stories, and is organized in a manner similar to Ad Stack.
7. Instantiated folio: physical object containing content defined in associated generic folio.
8. Instantiated jump box: physical object generated from associated generic jump boxes.
9. Page furniture: contains generic, user-specified content that is placed on each page of the physical paper.

Each version of the newspaper will contain its own set of logical and layout objects, and draw from its own unique content objects and those shared by other versions. In operation, the system initially loads a default set of objects with associated sets of default attributes. These objects and attributes may be altered, and new ones created, by user command (using the dal_get_obj_DAL).

Figure 4:
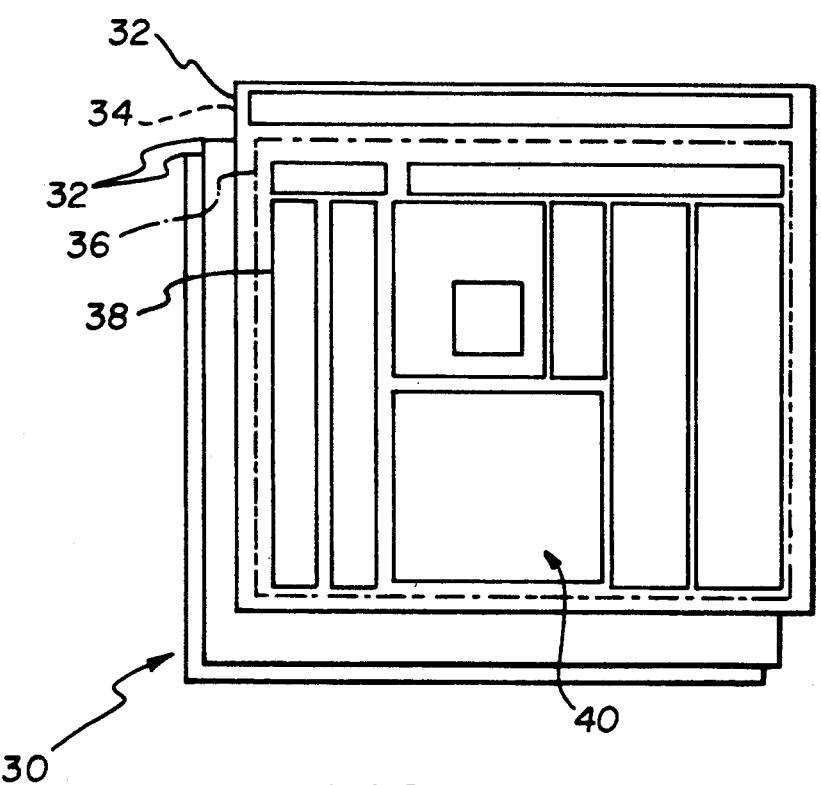
FIG. 4 illustrates the physical structures corresponding to the layout objects contained in the present embodiment of the invention.

The physical structures to which layout objects correspond are depicted in FIG. 4. A section 30 is composed of pages 32. The page labeled 34 is "Page 1" of this section. A single large frame 36 is illustrated, this frame containing a number of blocks 38. The content 40 of any particular block can consist of text, image, graphics or combinations thereof. Content objects and their associated attributes are mapped into blocks 38 during pagination.

A key feature of the invention is its ability to present the viewer with a logical document or a physical (layout) document. In the former case, the user may view the content and logical divisions of the publication. Moreover, the combination of named objects and full-text searching in the DBMS permits collection of material that is thematically related, or related in some other way (such as by author or the presence of a particular attribute). In the latter case, the physical appearance of the newspaper in its current stage of layout may be viewed. The logical view might be important to a writer editing the text of a story or group of related stories, while artists designing the magazine section would be more interested in the layout view.

This feature arises naturally from the organization of the document into logical and layout data structures, which are managed through a DBMS. The user or application program interacts with the DBMS to obtain the appropriate content and layout objects, which are interpreted by the input/output system and transformed into visual output.

The most general logical object is the logical root, which is the source of all logical divisions within the document. The logical root contains the following attributes:
1. Object Type Specification (object properties)
2. Descriptor Body
   a. Object identifier
   b. Subordinate object list
   c. Presentation attributes
   d. User-readable comments (can also be read by application program if appropriately configured)
   e. Bindings (names of bound computational procedures)
   f. User-visible name
   g. Presentation style
   h. Layout style
   i. Property attributes
   j. Version Attributes
   k. Management status attributes
   l. Lock Definition
   m. Layout directives
   [several highly specific attributes have been omitted]

Presentation attributes for the logical root include generalized formatting parameters that affect all document versions. Version attributes specify special characteristics associated with the different versions of the newspaper. Basic management status attributes indicate whether the object is defined, and if so whether the object is complete or incomplete. However, the user can define additional attributes in order to specify procedural status conditions necessary for access. The lock definition determines access privileges directly, and may be turned on or off by an application program that has been configured to respond to user-specified management status attributes.

All other logical objects (with the exception of content objects, as discussed below) contain a similar structure; however, the presentation attributes describe visual appearance with greater specificity:
1. Type of Coding (text, image or graphics)
2. Character Attributes (for text content, describe characteristics of each character [e.g. graphic rendition, font] and spacing among characters)
3. Word Attributes (spacing, justification, hyphenation, kerning)
4. Image Attributes (resolution, antialiasing, etc.)
5. Graphics Attributes (color and rendition values)
6. Background Color
7. Foreground Color
8. Color Model
9. Color Table (set of values used to compensate for special color characteristics associated with input or output device)
10. Grid Align (for layout objects)
11. Embedded (dummy) Representation
12. External Reference (for content objects, filename or memory address of content)

A content object can consist of text, image or graphic content, as well as combinations thereof. For example, a story may contain body text, a headline and associated photographs. Content can be entered into the system by keyboard terminals, telecommunication links, direct scanning or other external sources. Content objects contain data similar to other content objects, with certain exceptions. First, no subordinate object attribute is included. Second, content may be inserted into the content-object data structure itself, or specified by a filename or memory address corresponding to the content. Third, the presentation attributes determine appearance with greatest specificity; just how much more specific these presentation attributes will be as compared to those associated with more general objects depends on the publishing environment and user choice.

Logical pages are typically resolved into physical pages only when a sufficient amount of the content is known, and defined only when they are necessary to place material. A content object may be linked to a particular logical page or section by designating that content object as a subordinate object. If content is directed only to sections (i.e., content objects are linked directly to sections rather than to logical pages or page positions), no logical pages or page position objects will be necessary, and pagination will be largely unconstrained by logical organization.

Alternatively, frequent use of page position objects that specify content will largely determine pagination. As a loosely defined locational attribute (e.g. upper-right) of a content object, a page position provides only general guidance to a layout object regarding the content of that location; however, page positions may also be described in absolute coordinates, which would thereby specify layout. The user can also insert of placement information into the layout directive attribute of a content object (instead of creating a specific page position object) to direct pagination. With appropriate configuration of the Document Manager, priority values can be introduced into this attribute as well to more precisely indicate the level of placement importance. In this fashion, page position objects and layout directive attributes provide a link between the logical and physical structure of the newspaper.

Layout page set objects correspond to the sections of the newspaper, and page objects are the pages contained therein. Positions on a page are defined by a cartesian coordinate system, the origin of which lies at the upper left-hand corner as the page is normally viewed. Page objects contain the following attributes:
1. Identification
2. Lock Definition
3. Version Attributes
4. Protection Identification
5. Management Status Attributes
6. Physical Page Attributes
    a. Width (in physical units, e.g. decipoints)
    b. Depth (in physical units)
    c. Shape definition (for output)
    d. Color mask
    e. Number of versions in which object is used (for verification purposes)
    g. Outside bleed margin
    h. Inside bleed margin
    i. Top bleed margin
    j. Bottom bleed margin
    k. Number of news columns
    l. Width of news columns
    m. Gutter widths
    n. Number of classified ad columns (if any)
    o. Width of classified ad column
    p. Number of retail ad columns
    q. Width of retail ad column
    r. Vertical text grid spacing
7. Bindings Pages are also broken down into discrete rectangular areas called frame objects, which are themselves composed of rectangular block objects. Frame and block objects may be rotated by one degree increments within the areas defined by the superior objects. Frames and blocks may also extend beyond page boundaries in order to permit imaging content over multiple pages. Frame and block objects contain attributes similar to page objects, with the following additions:
1. Position (in page coordinates, relative to page origin)
2. Dimensions
3. User-readable comments
4. Bindings
5. Rotation angle
6. User-visible name
7. Color Model
8. Border characteristics
9. Rotation angle
10. Scaling factor
[For ease of understanding, attributes that also appear in the logical objects have been omitted]

The input/output system accepts these parameters and performs the actual operations as it prepares the content for output.

If an area of the frame lies outside the superior object's defined area, that outlying area will be clipped by the input/output system. Blocks can overlay each other and may be scaled. If an area of the block lies outside a superior object's defined area, that outlying area will be clipped.

c) Pagination

The newspaper is most advantageously composed in a manner that allows gradual definition of its contents, followed by a definition of its layout, followed by interactive stages of redefinition of both content and layout until a version of the paper is imaged. Interaction may take place on a distributed basis, and may be accomplished manually or by means of support software, i.e. a Document Manager.

Although pagination may be accomplished by numerous different means, any implementation must balance the following set of constraints: (1) organization of layout objects, to the extent specified; (2) existing layout objects that have already been assigned content; (3) the hierarchy of logical objects specifying various content objects; and (4) the size of content objects, which may individually or collectively exceed the logical locations to which they have been assigned.

The terms and expressions which have been employed are used as terms of description and not of limitation, and there is no intention, in the use of such terms and expressions, of excluding any equivalents of the features shown and described or portions thereof, but it is recognized that various modifications are possible within the scope of the invention claimed.

What is claimed is:

1. A document management and production system for accepting and organizing document information, the system comprising:
   a. electronic data-storage means comprising a plurality of data locations;
   b. means for storing in said data locations, for each document, information representative of document components that collectively specify content, organization and appearance of the document, said information including:
      1) logical document components defining structural divisions and structural relationships among information-bearing constituents of the document;
      2) attributes, if any, of such logical document components;
      3) layout document components that define how content is physically distributed and located within the document; and
      4) attributes, if any, of such layout document components;
   c. database-management means for specifying ordinal and hierarchical relationships among logical document components and among layout document components; and
   d. document-management means for integrating the logical and layout components into a single, organized document;

wherein at least some of the attributes associated with the logical document components contain information specifying locational preferences and positions of such components within the document, thereby facilitating mapping of logical document components that specify information-bearing constituents to layout document components to produce an integrated document.

2. The system of claim 1 wherein hierarchical relationships among document components result in association with a document component of any attributes associated with document components hierarchically superior thereto.

3. The system of claim 1 wherein the database-management means allows a plurality of hierarchically and/or ordinally distinct document components to specify the same content.

4. The system of claim 1 further comprising operator-responsive means for facilitating access to document components and modification thereof.

5. The system of claim 1 wherein the document-component information further comprises attributes that specify the ordinal and hierarchical relationships among document components.

6. The document management and production system of claim 1 wherein attributes associated with said logical document components and/or said layout document components specify the visual appearance of the information-bearing constituents.

7. The document management and production system of claim 6 wherein attributes associated with said logical document components and/or said layout document components further specify access restrictions associated with at least one logical document component and/or layout document component.

8. The document management and production system of claim 1 wherein attributes of an object further specify the location, in electronic storage, of executable computer code relating to the object.

9. The document management and production system of claim 1 wherein said logical document components comprise logical sections and pages.

10. The document management and production system of claim 9 wherein said logical document components further comprise logical page positions.

11. The document management and production system of claim 10 wherein said logical document components further comprise a logical root, logical stories and logical advertisements.

12. The document management and production system of claim 9 wherein said information-bearing constituents are represented as content elements.

13. The document management and production system of claim 12 wherein said content elements comprise story elements, advertisement elements, folios and jump boxes.

14. The document management and production system of claim 1 wherein said layout document components comprise page sets and pages.

15. The document management and production system of claim 13 wherein said layout document components further comprise frames and blocks.

16. The document management and production system of claim 15 wherein said layout document components further comprise a layout root, an ad stack, a newshole, folios, jump boxes and page furniture.

17. The document management and production system of claim 1 wherein said attributes and relationships are specified by means of first and second tables organized by said database-management means, said first table relating document components to associated attributes and said second table establishing relationships among document components.

18. The document management and production system of claim 4 wherein said database-management means is a relational database and further comprising processor means for storing, retrieving and modifying logical and layout document components by executing object-oriented commands in conjunction with said relational database.

19. The document management and production system of claim 18 wherein said object-oriented commands include memory allocation and deallocation functions related to object retrieval.

20. The document management and production system of claim 19 wherein said object-oriented commands further include page assembly functions that encapsulate page-related objects and associated output routines.

* * * * *